United States Patent [19]
Jacques et al.

[11] 4,132,461
[45] Jan. 2, 1979

[54] CONNECTING PLUG FOR OPTICAL CABLE

[75] Inventors: André Jacques; Luigi d'Auria; Chantal Moronville, all of Paris, France

[73] Assignee: Thomson-CSF, Paris, France

[21] Appl. No.: 771,365

[22] Filed: Feb. 23, 1977

[30] Foreign Application Priority Data

Feb. 27, 1976 [FR] France .................... 76 05584

[51] Int. Cl.² .............................................. G02B 5/14
[52] U.S. Cl. ................................ 350/96.20; 350/96.21
[58] Field of Search ........................................ 350/96 C

[56] References Cited
U.S. PATENT DOCUMENTS

| 3,846,010 | 11/1974 | Love et al. | 350/96 C |
| 3,917,383 | 11/1975 | Cook et al. | 350/96 C |
| 3,960,531 | 6/1976 | Kohanzadeh | 350/96 C X |
| 4,050,783 | 9/1977 | Tardy | 350/96 C |

FOREIGN PATENT DOCUMENTS 1450525  9/1976  United Kingdom ............... 350/96 C

*Primary Examiner*—John K. Corbin
*Assistant Examiner*—Rolf Hille
*Attorney, Agent, or Firm*—Cushman, Darby & Cushman

[57] ABSTRACT

The present invention relates to a plug which makes it possible with the help of an interconnecting device to position and connect in pairs optical fibres pertaining to optical cables. The positioning of each optical fibre is achieved by a three-elements set of cylindrical rods 21 arranged in the bushing of the plug. Each rod of the three-elements set has two generatrices in contact with its two neighbors, and one generatrix in contact with the introduced optical fibre. A hardenable bonding medium is introduced for cementing together said bushing, said rods and said optical fibre.

13 Claims, 6 Drawing Figures

CONNECTING PLUG FOR OPTICAL CABLE

FIELD OF THE INVENTION

The present invention relates to devices for connecting optical fibres, and more particularly to plugs for mounting at the ends of cables containing one or several optical fibres. Such plugs are designed for insertion in a suitable interconnecting device.

BACKGROUND OF THE INVENTION

A fibre used to guide optical radiation is constituted by two coaxial, refractive media: a core having a high refractive index and a medium surrounding the core and having a lower refractive index, which is referred to as the cladding. The radial variation in refractive index is chosen so that the radiation is totally reflected with the result that it remains confined within the core. In practice, the diameter of the core is generally between some few microns and around one hundred microns, and the diameter of the cladding is therefore in a range somewhat higher than this. For reasons of protection and facility of manipulation, the thus constituted fibre or a group of assembled identical fibres is surrounded by a protective sleeve, generally cylindrical in shape and made of a flexible material; each assembly constitutes a cable.

The object of the present invention is plugs which make it possible to achieve good connection between optical fibres or between optical fibres and an optical device. When two such optical fibres are to be connected, their terminal faces should be placed in the most intimate possible contact, so that the most perfect possible degree of coincidence is achieved. Moreover, their respective axes should be aligned at the level of the zone of interconnection to improve the connection optical efficiency. Consequently, the optical fibres are arranged in plugs equipped with flat terminal faces with which the ends of the optical fibres themselves finish flush; the arrangement is such that the direction of plugging in of the fibres is coincidental with the fibre axis. Since the connectors designed to receive the plugs have sliding surfaces which make it possible to effect assembly without any clearance the precise positioning of the fibres is determined using as a datum sliding surfaces pertaining to a bushing of the plug. Thus, the conditions of centring and alignment are fulfilled.

In the prior art, it is known to position the terminal part of an optical fibre within the body of a cylindrical bushing which is a solid of revolution with a right terminal section. The coaxial centring of the fibre in relation to the annular bushing is achieved by means of a set of six elastic rods having circular cross-sections, which serve as spacers between the fibre and the bushing and have the same diameter as the former. The elasticity of the spacer rods and their small diameter give rise to substantial deformations which are detrimental to the perfect centring of the fibre. Since the size of the rods is very small, accurate machining of them is a delicate operation. Finally, it turns out that there is no point in using six intervening rods when three would be sufficient.

In the same context, it is known to maintain an optical fibre in position by means of a set of three rigid rods; the rods are clamped with a thermo-retractable sleeve or equipped with clipping spring arrangements. This kind of solution leads again to a positioning inaccuracy and requires a high degree of skilfullness for assembling the various parts.

It is also known to connect end to end planar arrangements of optical fibres between two plates containing semicircular projections. Two adjacent projections define a groove which receives two ends of optical fibres which are to be connected. The plates are tied together by a clipping operation, and, since the projections are made of a material which is less rigid than that of the fibres, they deform. Although the end to end fitting of the fibres may be correct, this connecting technique does not ensure accurate location of the fibres in relation to the external faces of the assembly plates.

SUMMARY OF THE INVENTION

In accordance with the present invention, there is provided a connecting plug for optical cable comprising at least one optical fibre surrounded by a sleeve, said connecting plug comprising: a bushing, a bunch of cylindrical rods arranged inside said bushing; said cylindrical rods having identical circular sections; said bunch including at least one three elements set of said cylindrical rods; each cylindrical rod in said three-elements set having a generatrix in contact with each of its two neighbours in said set; said optical fibre having one generatrix in contact with each of the cylindrical rods of said three-elements set; said bunch externally bearing against the internal wall of said bushing; said connecting plug further comprising an element for coupling said sleeve to said bushing; said bushing being a profiled rigid mechanical body whose inner and outer lateral walls are cut with parallel generatrices; a bonding material being introduced into said bushing for securing said bushing to said rods and said optical fibre.

For a better understanding of the invention and to show how the same may be carried into effect, reference will be made to the ensuing description and the following drawings among which:

FIG. 1, (a) and (b), illustrates views in section of a plug in accordance with the invention;

FIG. 2, (a) and (b), illustrates views in section of a variant embodiment of the connecting plug in accordance with the invention;

Figure 1:
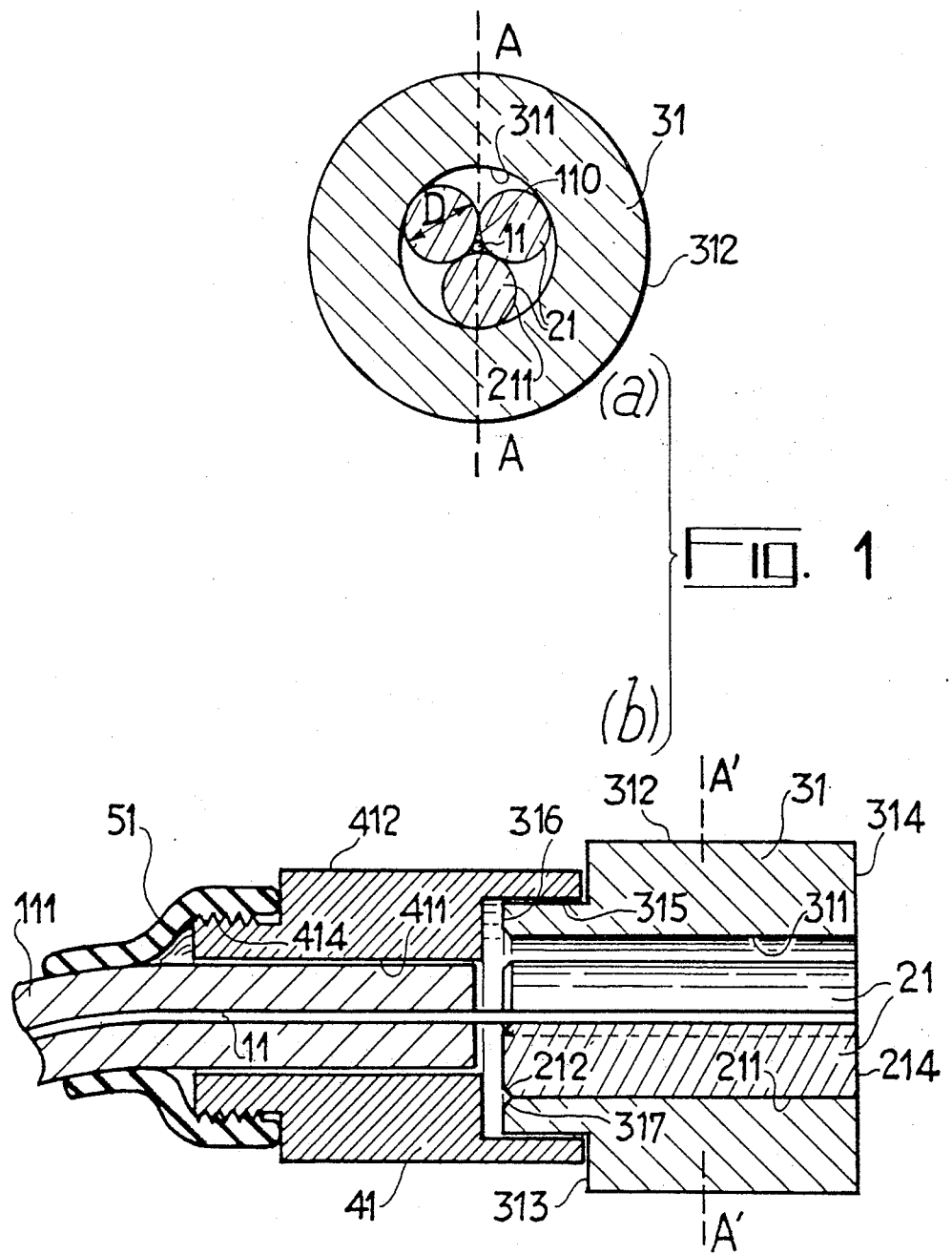

FIG. 1, (a) illustrates the section view on the line A'A' of a connecting plug for an optical fibre cable in accordance with the invention. The plug is constituted by a cylindrical bushing 31 defined by an outer lateral wall 312 and an inner lateral wall 311 coaxial therewith. A three-elements bunch made up of three cylindrical rods 21 having circular sections of the same predetermined diameter D, is inserted into the bushing 31. The diameter of the wall 311 is a function of a diameter D since each cylindrical section 211 of a rod 21 possesses, within the bunch, two generatrices in contact with its neighbours and a third generatrix in contact with the inner lateral wall 311. This plug design implies that any other arrangement of the three rods can be converted to the present arrangement by rotation of the system about the axis of the bushing and that beyond the latter no additional radial supporting of the rods 21 is required.

The rods and the bushing can be made of a precision machinable material such as hardened steel. It can be arranged for a treatment such as chrome plating to be carried out in order to prevent any risk of oxidation. By way of other materials, reference can be made to ceramic and glass manufactured by techniques of extrusion and grinding.

The bunch of three rods 21 delimits a duct 110 inside which a cylindrical optical fibre 11 of given diameter d can be freely inserted without any clearance or backlash. The diameter D of the rods 21, the diameter $\phi$ of the section 311 defined by the bore and the diameter d of the optical fibre 11, must comply with the following relationships $$D = d \cdot \sin(\pi/N)/(1 - \sin(\pi/N))$$

and $\phi = 2D + d$ where the letter N represents the number of cylinders of diameter N which are consecutively adjacent one another and circumscribe the fibre of diameter of d. The number N is equal to three in the case of FIG. 1 and cannot of course be less than three. It will be observed that for the same accuracy of machining of the rods 21, the best centring on the part of the optical fibre is achieved using three rods forming the three-elements of triad arrangement of the invention.

FIG. 1 illustrates at (b) a longitudinal sectional view on the axis AA, of the complete device used to ensure positioning and location of the end of an optical fibre. In order not to overburden the drawing, the dimensions of the various elements illustrated have not been shown to scale. The assembly of the plug is performed in the following way: the rods 22 are inserted via the face 316 of the bushing 31 into its internal bore; chamfers 317 and 212 facilitate the introduction of the rods; the terminal section 214 of the rods 21 move into a position flush with the connecting face 314 of the bushing 31. The bushing 31 at the cable side, comprises a shoulder defined by two zones 313 and 315 onto which a ring 41, made for example of brass and containing a surface bore 411 matching the external diameter of the protective sleeve 111 of the optical fibre cable, is fitted. A flexible cable guide 51 attached to the sleeve 111 is fitted onto the terminal section 414 of the ring 41 in order to prevent the cable from breaking under conditions of repeated or excessive bending.

At the time of assembly of a plug, the terminal part of the optical fibre cable has its protective sleeve removed over a given length. The fibre 11 plus its remaining protective sleeve 111 are inserted into the cable guide 51 and then into the ring 41; the bared end of the optical fibre 11 is introduced into the duct 110 in the plug until it slightly projects beyond the connecting face 314 of the bushing; the chamfers 212 facilitate the introduction of the fibre 11. With the optical fibre maintained in this position, a bonding medium is introduced into the interstices in order to secure the fibres, the rods 21 and the bushing, once it has hardened. The ring 41 is slipped over the bushing 31 and bonded in position internally. The bonding product thus also secures the sleeve 111 in position in the bore of the ring 41. Finally, the cable guide 51 is installed.

The circumference 412 of the ring 41, in FIG. 1, has a smaller diameter than that of the external wall 312 of the bushing 31 which serves as reference of the fibre axis position for establishing the connection. The end of the optical fibre is ground to give it a circular cross-section which can be located in the same plane as the front faces 214 of the centring rods 21. In practice, in view of the precision to be achieved in the diameter D and $\phi$ of the rods and the internal bore in the bushing, a sorting is carried out in order to match the elements which are to be assembled within the same plug.

The optical fibre thus positioned within the plug, has three contact generatrices, one with each rod 21; three other optical fibres of larger diameter can also be positioned, each of them having three generatrices of contact, one with the bushing and two with the rods 21.

Figure 2:
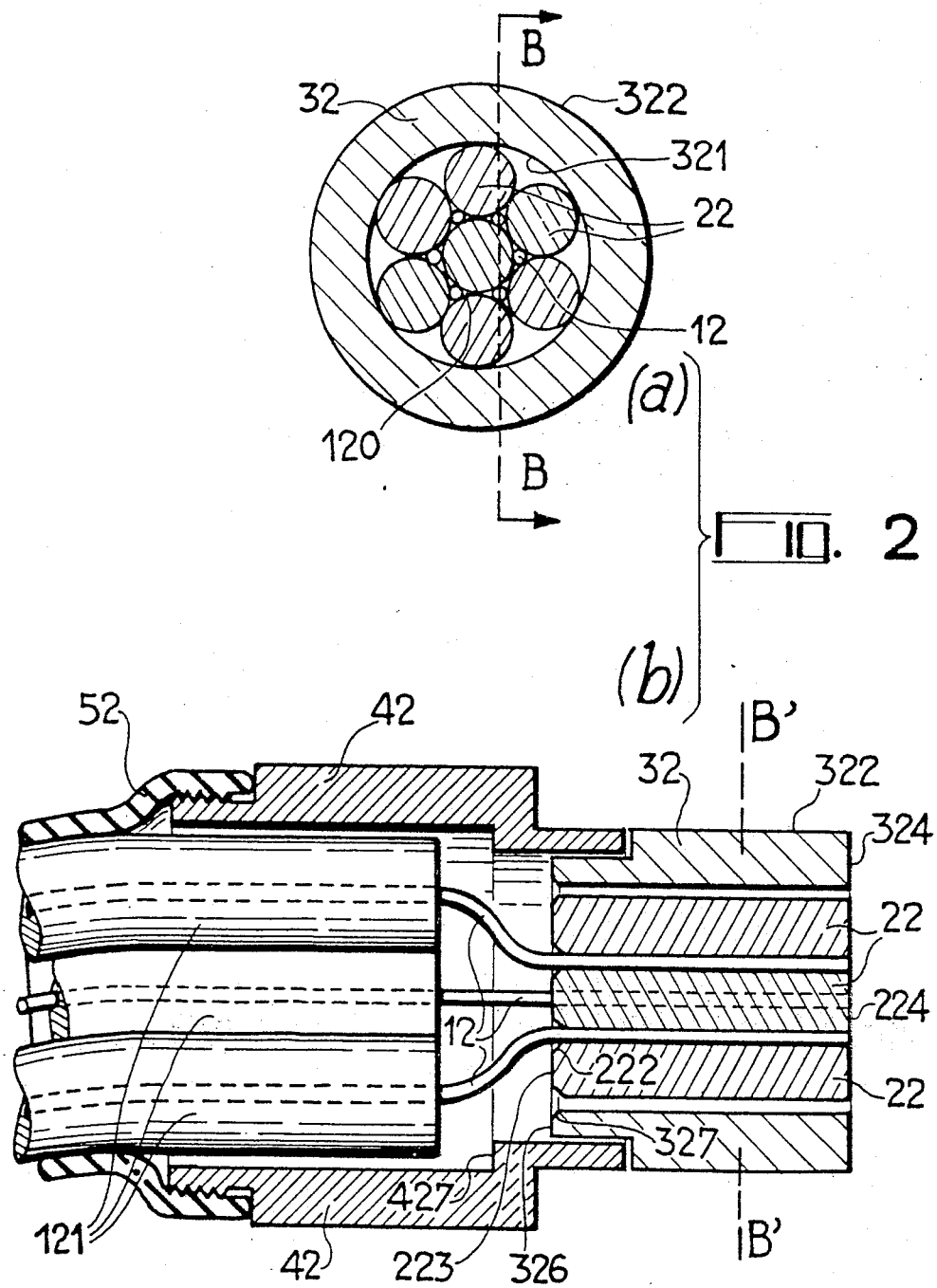

FIG. 2 illustrates at (a) a sectional view, on the line B'B' of a connecting plug for several cables each comprising an optical fibre. This plug comprises a bushing 32 with a sliding surface 322 and an internal wall 321 defined by a coaxial bore. Seven centring rods 22 of cylindrical shape and of the same diameter are introduced into the bushing 32; each rod 22 has at least three generatrices in contact with its neighbours; the six peripheral rods 22 each have a generatrix in contact with the wall 321. Six identical channels 120 are thus defined, each capable of receiving an optical fibre 12 whose diameter predetermines the diameter of the rods 22. In fact, each optical fibre is positioned by a set of three rods 22.

FIG. 2 illustrates at (b) a longitudinal section view on the line BB of the complete device used to effect positioning and holding of a bunch of six optical fibre cables. In order not to overburden the drawing, the proportions have not been adhered to. First of all, the assembly of the plug is effected: the rods 22 are inserted through the face 326 of the bushing 32 into its internal bore; chamfers 327 and 222 facilitate this introduction of the rods; the right terminal sections 224 of the rods are placed in a plane which can coincide with the face 324 of the bushing 32. The complete assembly device of FIG. 2 further comprises a cylindrical ring 42, made for example of brass, all or part of whose internal bore may receive six optical fibre cables 12 with their six individual protective sleeves 121 and a cable guide 52 of elastic material which is fitted over both the cables and the ring 42.

The assembly of the device shown in FIG. 2 is performed in a manner similar to that of the device shown in FIG. 1. In addition, the size of the protective sleeves 121 determines the diameter of the internal bore of the ring 42. In accordance with the sizes, an undercut 427 may be required; it is then positioned in order to limit the curvatures of the optical fibres outside the plug.

Figure 3:
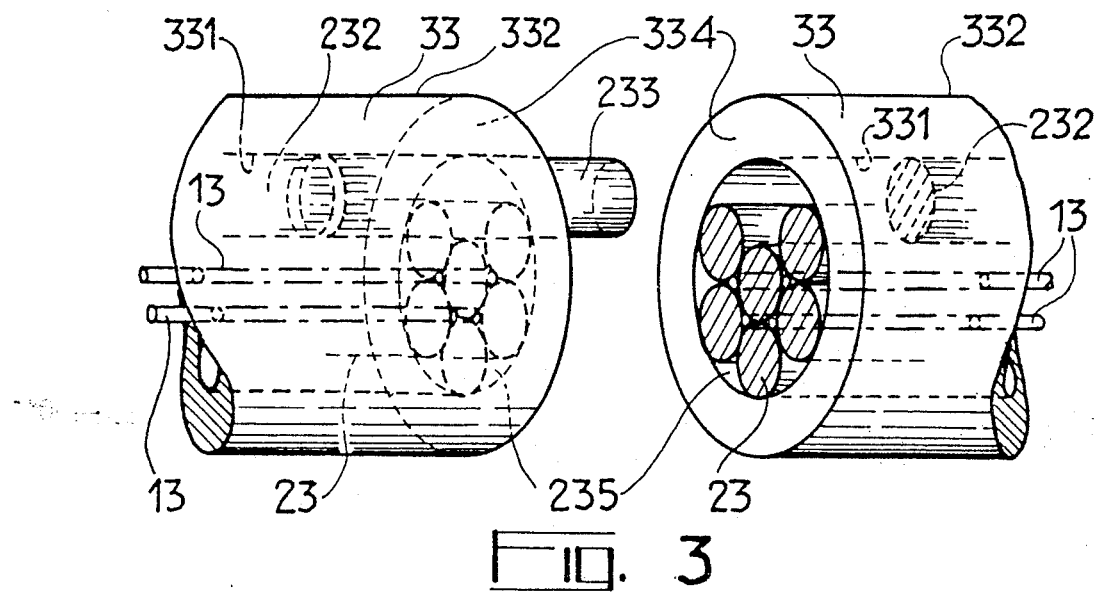
FIG. 3 is an isometric view illustrating two plugs and an aligning key element.

FIG. 3 is an isometric view of two plugs with seven rods, whose front faces 334 are located opposite each other; each is responsible for positioning four optical fibres 13 in accordance with a system similar to that of FIG. 2. Each plug comprises a cylindrical bushing 33 with an external wall 332 and a coaxial bore 331. Seven cylindrical rods of the same diameter are introduced into the bushing 33 but one of the peripheral rods, namely that 232, is set back from the others.

The fibre-to-fibre connection is achieved in the following fashion: a positioning element, constituted by a cylindrical rod 233 of the same diameter as that of the other rods 23, is inserted into one of the bushings 33 so as to project beyond the front face of the plug; another rod 232 is arranged in the other bushing 33 standing back from the other rods, so as to provide an empty space in the corresponding front face; the two rods are then arranged face to face so that the positioning rod 233 is inserted into the space not occupied by the rod 232 in said second plug. Means outside the plugs are then required in order to align the two bushings. This type of connection using a positioning element may employ more than one rod 233 but in this case the number of optical fibres 13 to be connected in pairs will be reduced. The positioning system can also use one or more cylindrical aligning keys fitted into the spaces 235 delimited by two neighbouring peripheral rods 23 and the opened out wall 331 of the bushing 33.

Figure 4:
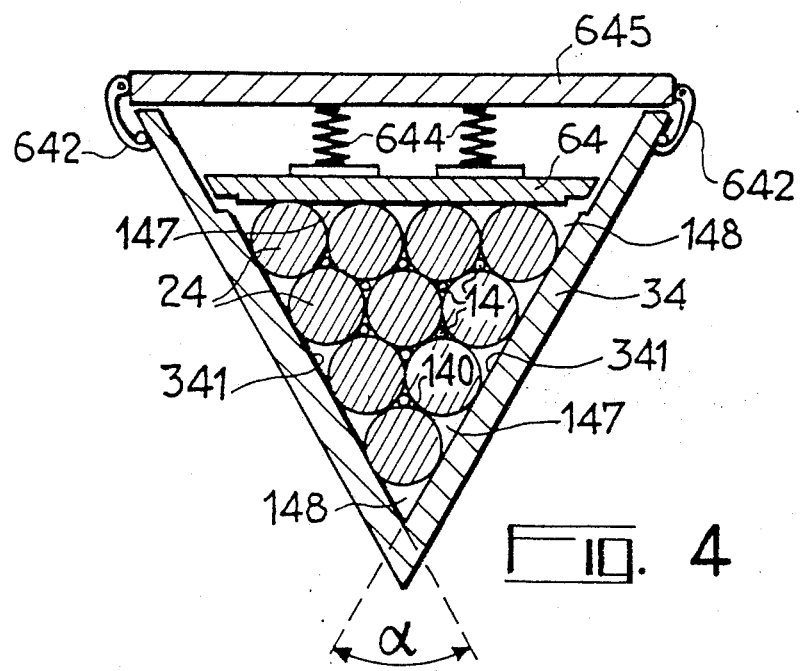
FIG. 4 is a sectional view of another embodiment of the plug in accordance with the invention.

FIG. 4 illustrates a view in the form of a right section through another embodiment of a plug in accordance with the invention. This plug includes a bushing of triangular shape constituted by a Vee 34 whose internal faces 341 form a dihedral angle $\alpha$ equal to 60°, and a slipper 64; the prismatic space is occupied by cylindrical rods 24 of equal diameter whose axes are parallel to the apex of the dihedral angle $\alpha$. The rods 24 form a stack with no clearance, inside the Vee 34; this result is achieved by means of the slipper 64 which is loaded by springs 644 seating against a cover 645 held in position by a system of clips 642. The optical fibres 14 are introduced into the passages 140 delimited by each three-elements set of rods 24. The fibre-to-fibre connection by means of plugs having the structure shown in FIG. 4, can be achieved using a connector equipped with a base containing a Vee-shaped notch. As before, rods or stubs, used as aligning key elements, can be inserted into each plug in order to achieve perfect matching between the optical fibres which are to be fitted end to end. Optical fibres of diameter larger than that of those 14, can also be inserted into the spaces 147 which are delimited by two rods 24 and a bushing wall, or into the spaces 148 delimited by a rod and two wall sections.

Figure 5:
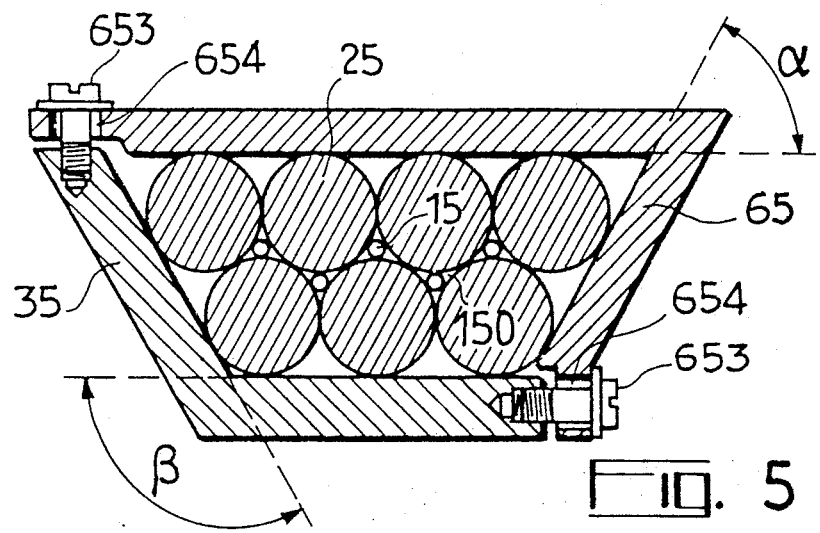
FIG. 5 is a sectional view of a plug whose bushing has a trapezoidal section.

FIG. 5 illustrates a sectional view through another embodiment of the plug in accordance with the invention. This variant embodiment comprises a trapezoidally shaped bushing employing two Vee-shaped sections, 35 and 65, the internal dihedral angles of which are defined by $\alpha$ and $\beta$, these angles respectively being equal to 60° and to 120°. The trapezoidal internal space of the bushing is occupied by a stack of two sets of cylindrical rods 25. Fixing systems comprising screw 653 passing through openings 654 formed in the Vee 65, and screwing into the Vee 35, form an assembly which secures the rods 25 in contact with one another. The optical fibres 15 are introduced into and bonded in position in the spaces 150 formed by each three-element set of rods 25. This design is particularly suitable in the situation where the optical fibres form planar arrangements.

In order to facilitate positioning and introduction of the rods 25 into the body of the bushing, with its two Vees 35 and 65, it is arranged to use rods 25 of magnetisable material, with or without remanence. As in the case of FIG. 4, the trapezoidal configuration of the plug lends itself to fibre-to-fibre interconnection through the agency of a base comprising a Vee-shaped notch.

Figure 6:
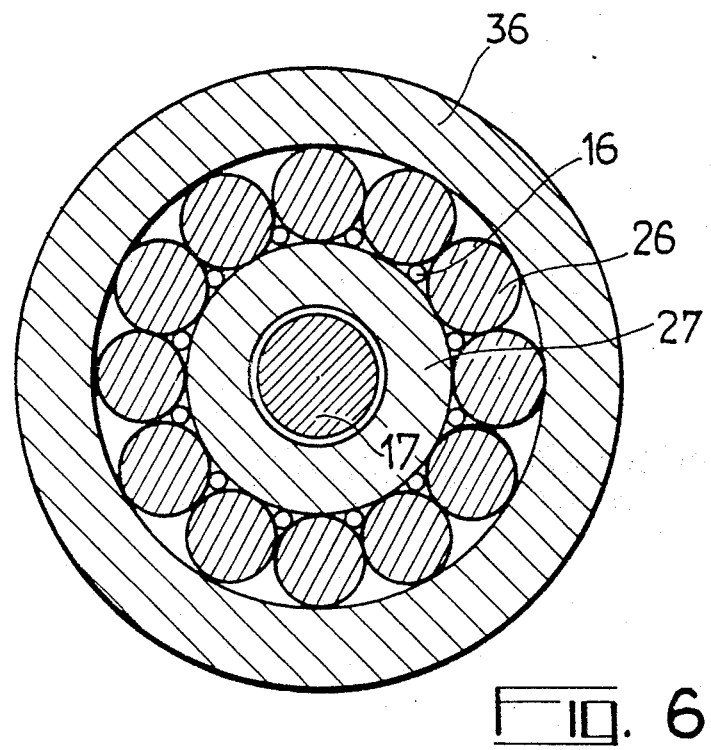
FIG. 6 is a sectional view of a plug with spacer rods having different diameters.

FIG. 6 illustrates a sectional view of another plug structure in accordance with the invention. This plug makes it possible to interconnect optical fibre cables and cable supports which take the mechanical stresses; the latter can also carry electrical power of the kind required by an apparatus which compensates for the attenuation occurring in the optical radiation guided by the optical fibres along a section. This plug comprises a bushing 36 with cylindrical external wall and containing a coaxial bore, a central rod 27 of cylindrical shape containing an axial bore inside which the cable support 17 is intended to be fitted, and cylindrical peripheral rods 26 which, in association with the hollow central rod 27, serves to accurately position the optical fibres 16.

What we claim is:

1. A connecting plug for optical cable comprising at least one optical fibre surrounded by a sleeve, said connecting plug comprising: a bushing, a bunch of cylindrical rods arranged inside said bushing; said cylindrical rods having identical circular sections; said bunch including at least one three elements set of said cylindrical rods; each cylindrical rod in said three-elements set having a generatrix in contact with each of its two neighbours in said set; said optical fibre having one generatrix in contact with each of the cylindrical rods of said three-elements set; said bunch externally bearing against the internal wall of said bushing; said connecting plug further comprising an element for coupling said sleeve to said bushing; said bushing being a profiled rigid mechanical body whose inner and outer lateral walls are cut with parallel generatrices; a bonding material being introduced into said bushing for securing said bushing to said rods and said optical fibre.

2. A connecting plug as claimed in claim 1, wherein said bunch comprises a further cylindrical rod having a circular section.

3. A connecting plug as claimed in claim 2, wherein the diameters of said cylindrical rods differ from the diameter of said further cylindrical rod.

4. A connecting plug as claimed in claim 1, wherein said bushing has a cylindrical bore.

5. A connecting plug as claimed in claim 1, wherein the inner lateral wall of said bushing has a prismatic section.

6. A connecting plug as claimed in claim 5, wherein said inner lateral wall has a convex polygonal section.

7. A connecting plug as claimed in claim 6, wherein said convex polygonal section is triangular.

8. A connecting plug as claimed in claim 6, wherein said convex polygonal section is a quadrilateral section.

9. A connecting plug as claimed in claim 1, wherein at least one aligning key element is provided for ensuring correct fibre-to-fibre matching in accordance with a predetermined pattern.

10. A connecting plug as claimed in claim 9, wherein said aligning key element is a cylindrical rod.

11. A connecting plug as claimed in claim 9, wherein said aligning key element is a polygonal-section stub.

12. A connecting plug as claimed in claim 1, wherein the material of said cylindrical rods is a magnet material.

13. A connecting plug as claimed in claim 1, wherein at least one of said cylindrical rods comprises an internal bore.

* * * * *